United States Patent [19]

Akashi

[11] Patent Number: 5,074,330

[45] Date of Patent: Dec. 24, 1991

[54] ANTI-ABNORMAL-PRESSURE/VACUUM VALVE

[75] Inventor: Mitsumasa Akashi, Kawasaki, Japan

[73] Assignee: Kabushiki Kaisha Komatsu Seisakusho, Tokyo, Japan

[21] Appl. No.: 548,990

[22] PCT Filed: Nov. 30, 1989

[86] PCT No.: PCT/JP89/01208

§ 371 Date: Sep. 18, 1990

§ 102(e) Date: Sep. 18, 1990

[30] Foreign Application Priority Data

Nov. 30, 1988 [JP] Japan .................. 63-154989

[51] Int. Cl.$^5$ ............................ F16K 17/18
[52] U.S. Cl. ................. 137/493.3; 137/493.6
[58] Field of Search ................ 137/493.3, 493.6

[56] References Cited

U.S. PATENT DOCUMENTS 3,112,763 12/1963 Tennis et al. .............. 137/493.6 X
4,016,903 4/1977 Akashi et al. .............. 137/493.6 X

FOREIGN PATENT DOCUMENTS 51-69917 6/1976 Japan .
56-156570 12/1981 Japan .

Primary Examiner—Gerald A. Michalsky
Attorney, Agent, or Firm—Armstrong, Nikaido, Marmelstein, Kubovcik & Murray

[57] ABSTRACT

An improved anti abnormal-pressure/vacuum valve has a sleeve-like valve provided with a projection at its front end projecting into an actuator-side port, and a pressure introducing tube in a spool valve slidable in the sleeve-like valve for introducing oil pressure into a valve pressing chamber at the rear of the sleeve-like valve has its front-end portion disposed inside a front-end surface of the spool valve. This converts a dynamically varying pressure in the actuator-side port into a statically varying pressure in the valve pressing chamber so as to prevent the sleeve-like valve from being accidentally separated from its valve seat when oil pressure in the actuator-side port varies dynamically.

1 Claim, 2 Drawing Sheets

ANTI-ABNORMAL-PRESSURE/VACUUM VALVE

FIELD OF THE INVENTION

The present invention relates to an anti abnormal-pressure/vacuum valve installed in a control valve provided in a hydraulic circuit for driving an actuator employed in construction machines and the like.

DESCRIPTION OF THE PRIOR ART

A conventional control valve installed in a hydraulic circuit for driving an actuator employed in machine has a construction, for example such as that shown in FIG. 1, in which: a spool valve 4 is movably mounted in a valve body 1 of the control valve so as to permit/prevent communication between a pump-side port 2 and an actuator-side port 3 in the valve body 1, whereby pressure oil supplied from a hydraulic pump (not shown) to the pump-side port 2 of the valve body 1 is controlled so as to be appropriately supplied to the actuator (not shown) of the machine through the actuator-side port 3 of the valve body.

In the conventional control valve having the above construction, in order to prevent excessive oil pressures or abnormal pressures from being produced in the hydraulic circuit when the actuator is overloaded, and also in order to prevent a possible vacuum from developing in the actuator due to a deficiency of pressure oil therein when the actuator is moved by an external force, there is provided an anti abnormal-pressure/vacuum valve "A" for permitting/preventing the communication between the actuator-side port 3 and a reservoir-side port 5 in the valve body 1 of the control valve, as shown in FIG. 1.

The anti abnormal-pressure/vacuum valve "A" provided in the conventional control valve has a construction, for example, such as that shown in FIG. 2.

In the construction of the conventional anti abnormal-pressure/vacuum valve "A", as shown in FIG. 2, a sleeve-like valve 11 is slidably mounted in a sleeve-like case 10 in an insertion manner. In a front end portion of the valve 11 are formed: a first port 12; and a second port 13. A spool valve 14 is slidably mounted in the sleeve-like valve 11 in an insertion manner so as to permit/prevent communication between the first port 12 and the second port 13 of the sleeve-like valve 11, while pressed against a valve seat formed in a peripheral portion of the first port 12 of the sleeve-like valve 11 under the influence of a resilient force exerted by a compression spring 15 to prevent the communication between the first port 12 and the second port 13. A pressure-introducing tube 16 is slidably mounted in the spool valve 14 in an insertion manner to permit communication between the actuator-side port 3 of the valve body 1 and a valve pressing chamber 17, so that the sleeve-like valve 11 is pressed against a valve seat 1a under the influence of a pressure of the pressure oil supplied to the valve pressing chamber 17 from the actuator-side port 3 through a central port of the pressure-introducing tube 16. The valve seat 1a is formed in a peripheral portion of the actuator-side port 13 of the valve body 1.

In the conventional anti abnormal-pressure/vacuum valve "A" having the above construction, when the valve "A" is subjected to excessive pressure or abnormal pressure at the actuator-side port 13, the spool valve 14 is moved rightward as viewed in FIG. 2 against the resilient force exerted by the compression spring 15 under the influence of such excessive pressure or abnormal pressure to permit the communication between the first port 12 and the second port 13, so that the pressure oil supplied to the actuator-side port 3 at such excessive pressure of abnormal pressure flows out of the port 3 to the reservoir-side port 5, whereby the abnormal pressure is removed from the valve body 1 of the control valve.

On the other hand, in the conventional anti abnormal-pressure/vacuum valve "A" having the above construction, when the valve "A" is subjected to a possible vacuum at the actuator-side port 13, a pressure in the valve pressing chamber 17 reduces so that the sleeve-like valve 11 is moved rightward as viewed in FIG. 2 under the influence of a rightward force acting on the sleeve-like valve 11. Such rightward force is substantially a product of a predetermined area and a pressure of the pressure oil in the reservoir-side port 5, the predetermined area being a difference in cross-sectional area between a bore of the sleeve-like case 10 having an inner diameter $d_1$ and the actuator-side port 3 having an inner diameter $d_2$. As a result of the above-described rightward motion of the sleeve-like valve 11, the sleeve-like valve 11 is separated from the valve seat 1a of the valve body 1 to permit communication between the actuator-side port 3 and the reservoir-side port 5, so that the pressure oil in the reservoir-side port 5 is introduced into the actuator-side port 3 to prevent a possible vacuum from developing in the actuator-side port 3 of the valve body 1 of the control valve.

However, since the conventional anti abnormal-pressure/vacuum valve "A" employed in the control valve has the above construction, the pressure-introducing tube 16 extends leftward as viewed in FIG. 2 to enter the actuator-side port 3. Consequently, when the pressure in the pressure oil in the actuator-side port 3 varies dynamically, the pressure in the pressure oil in the valve pressing chamber 17 also dynamically varies to permit the sleeve-like valve 11 to accidentally separate from the valve seat 1a of the valve body 1 even when no vacuum develops in the actuator-side port 3. Therefore, as is clear from the above description, in the conventional anti abnormal-pressure/vacuum valve "A", there is a fear that the pressure oil supplied from the pump-side port 2 to the actuator-side port 3 is drained back into the reservoir-side port 5 by accident.

Incidentally, as an example of dynamic variation in pressure of the pressure oil in the actuator-side port 3 of the valve body 1 may be cited the fact that: as shown in FIG. 1, when the spool valve 4 is gradually moved rightward to have its concave portion 4a slightly enter the actuator-side port 3, jets of the pressure oil supplied from the pump-side port 2 are spouted into the actuator-side port 3 to cause the pressure oil in the actuator-side port 3 to dynamically vary.

SUMMARY OF THE INVENTION

Under such circumstances, the present invention was made. Therefore, it is an object of the present invention to provide an anti abnormal-pressure/vacuum valve installed in a control valve provided in a hydraulic circuit for driving an actuator employed in construction machines and the like, which anti abnormal-pressure/vacuum valve of the present invention eliminates dynamic variations in pressure of the pressure oil in the hydraulic circuit to permit the pressure oil to vary statically in the hydraulic circuit so that the thus statically varying pressure oil is introduced into the valve pressing chamber 17 oppositely disposed from the actuator-side port 3 to prevent pressure oil having supplied to the actuator-side port 3 from being drained back into the reservoir-side port 5 by accident.

In accordance with a first aspect of the present invention, the above object of the present invention is accomplished by providing:

In an anti abnormal-pressure/vacuum valve comprising: a first and a second port both of which are formed on a front-end side of a sleeve-like valve for permitting/preventing communication between an actuator-side port and a reservoir-side port both of which are formed in a valve body of a control valve provided in a hydraulic circuit for driving an actuator employed in construction machines and the like, the first and the second port being in communication with the actuator-side port and the reservoir-side port, respectively; a spool valve slidably mounted in the sleeve-like valve, for permitting/preventing communication between the first port and the second port, the communication between the first port and the second port being prevented by a resilient force exerted by a compression spring and being permitted when the resilient force exerted by the compression spring is overcome by a pressure of the pressure oil in the actuator-side port; and a pressure introducing tube slidably mounted in the spool valve, for introducing the pressure of the pressure oil supplied to the actuator-side port into a valve pressing chamber so as to press the sleeve-like valve against a valve seat formed in the valve body of the control valve; whereby the sleeve-like valve is separated from the valve seat when the pressure oil in the actuator-side port is smaller in pressure than that in the reservoir-side port, the improvement wherein:

the sleeve-like valve is provided with a sleeve-like projection at its front end, which projection projects into the actuator-side port; and the pressure introducing tube has its front-end portion disposed inside a front-end surface of the spool valve.

In the anti abnormal-pressure/vacuum valve of the present invention having the above construction, it is possible for the sleeve-like projection of the sleeve-like valve to eliminate a fear that the pressure of the pressure oil in the actuator-side port varies dynamically, so that the statically varying pressure of the pressure oil is introduced into the valve pressing chamber through the pressure introducing tube. Consequently, in the anti abnormal-pressure/vacuum valve of the present invention, there is no fear that the sleeve-like valve is accidentally separated from the valve seat even when the pressure of the pressure oil in the actuator-side port tends to vary dynamically.

As a result, it is possible for the anti abnormal-pressure/vacuum valve of the present invention to prevent the pressure oil in the actuator-side port from being accidentally drained back into the reservoir-side port, the pressure oil being supplied to the actuator-side port from the pump-side port.

The above object, additional objects, additional embodiments and advantages of the present invention will be clarified to those skilled in the art hereinbelow with reference to the following description and the accompanying drawings illustrating preferred embodiments of the present invention.

BRIEF DESCRIPTION OF THE DRAWINGS

FIG. 1 is a cross-sectional view of an essential part of the conventional control valve provided in the hydraulic circuit for driving the actuator employed in the construction machines and the like;

DESCRIPTION OF THE PREFERRED EMBODIMENT

Figure 2:
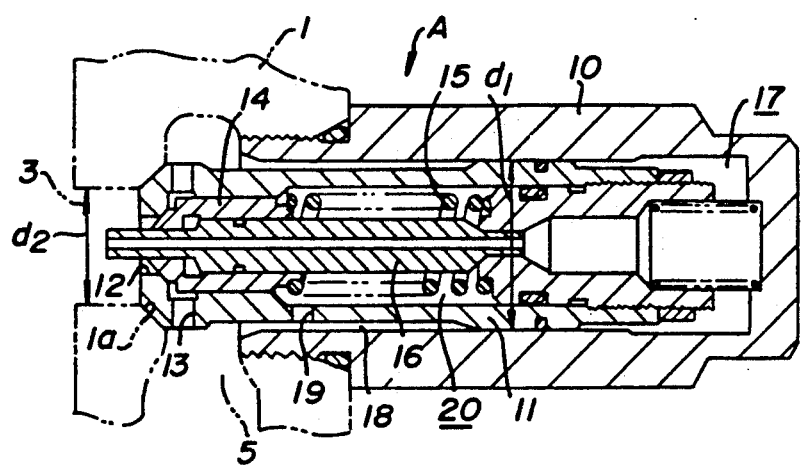
FIG. 2 is a cross-sectional view of the conventional anti abnormal-pressure/vacuum valve.
Figure 3:
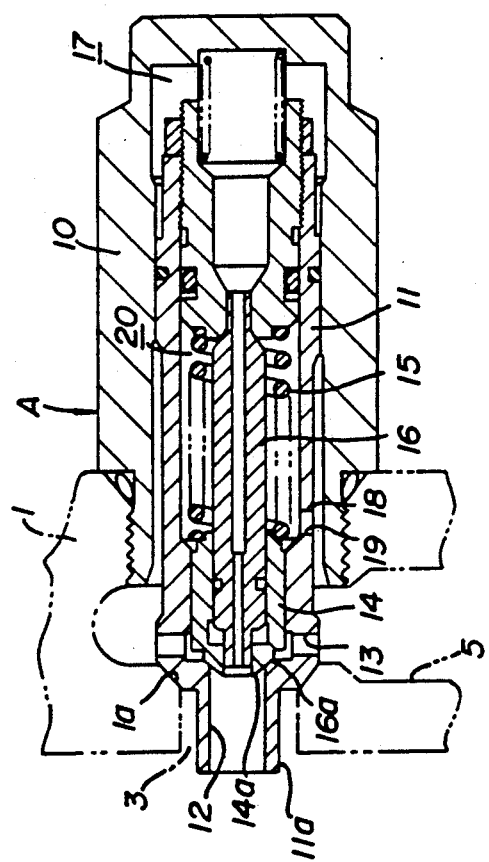
FIG. 3 is a cross-sectional view of an anti abnormal-pressure/vacuum valve of a preferred embodiment of the present invention.

In FIG. 3, there is shown an anti abnormal-pressure/vacuum valve of a preferred embodiment of the present invention, which valve is mounted in the valve body 1 of the control valve shown in FIG. 2.

Figure 1:
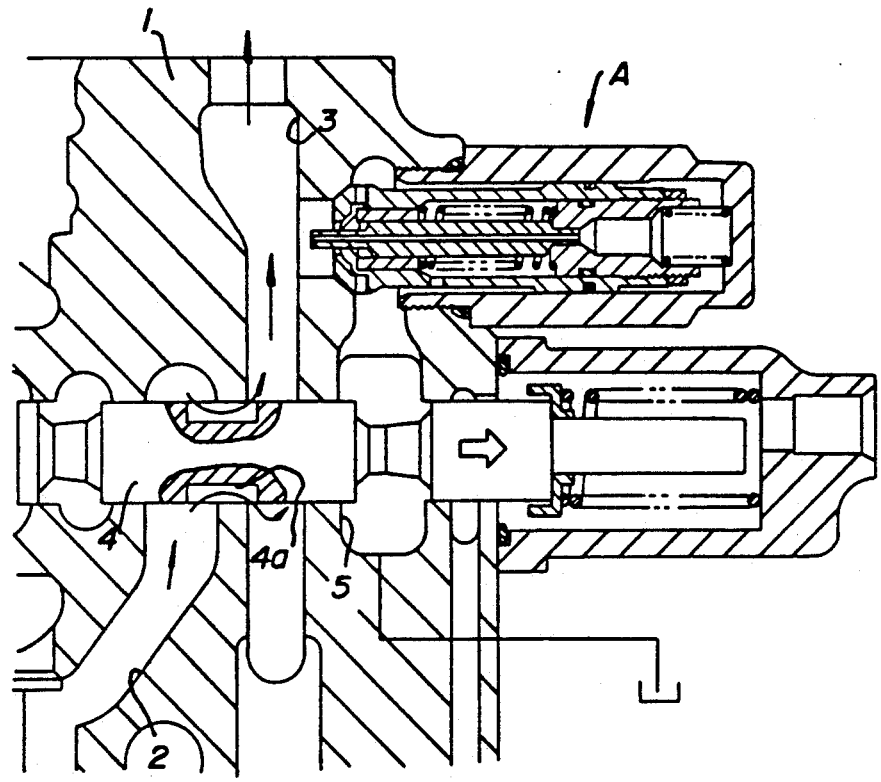

As is clear from FIGS. 1 to 3, the conventional anti abnormal-pressure/vacuum valve shown in FIG. 2 is partially improved in accordance with the present invention to become the preferred embodiment of the present invention shown in FIG. 3. As described above, both the anti abnormal-pressure/vacuum valve of the prior art shown in FIG. 2 and that of the prevent invention shown in FIG. 3 are basically the same in structure, and, therefore the description of the basic structure of the anti abnormal-pressure/vacuum of the present invention shown in FIG. 3 is omitted by representing the like elements by like reference numerals to avoid redundancy in description hereinbelow.

As shown in FIG. 3, a sleeve-like valve 11 is provided with a sleeve-like projection 11a in its front end, which projection 11a is integrally formed with the sleeve-like valve 11 to project into the actuator-side port 3 formed in the valve body 1 of the control valve. On the other hand, a front end 16a of a pressure introducing tube 16 is disposed inside a front-end surface 14a of the spool valve 14.

Since the anti abnormal-pressure/vacuum valve of the present invention has the above construction, when the pressure of the pressure oil in the actuator-side port 3 varies dynamically, such dynamically varying pressure of the pressure oil in the actuator-side port 3 exerts upon the sleeve-like projection 11a of the sleeve-like valve 11 so as to be converted into a statically varying pressure which is introduced into the valve pressing chamber 17 through the pressure introducing tube 16, the valve pressing chamber 17 being oppositely disposed from the actuator-side port 3. Consequently, it is possible for the anti abnormal-pressure/vacuum valve of the present invention to prevent the sleeve-like valve 11 from being accidentally separated from the valve seat 1a even when the pressure of the pressure oil in the actuator-side port 3 varies dynamically, the valve seat 1a being formed in the valve body 1 of the control valve.

I claim:

1. In an anti abnormal-pressure/vacuum valve comprising: a first and a second port both of which are formed on a front-end side of a sleeve-like valve for permitting/preventing communication between an actuator-side port and a reservoir-side port both of which are formed in a valve body of a control valve provided in a hydraulic circuit for driving an actuator employed in construction machines and the like, said first and said second port being in communication with said actuator-side port and said reservoir-side port, respectively; a spool valve slidably mounted in said sleeve-like valve, for permitting/preventing communication between said first port and said second port, said communication between said first port and said second port being prevented by a resilient force exerted by a compression spring and being permitted when the resilient force exerted by said compression spring is overcome by a pressure of the pressure oil in said actuator-side port; and a pressure introducing tube slidably mounted in said spool valve, for introducing the pressure of the pressure oil supplied to said actuator-side port into a valve pressing chamber so as to press said sleeve-like valve against a valve seat formed in said valve body of the control valve; whereby said sleeve-like valve is separated from said valve seat when the pressure oil in said actuator-side port is smaller in pressure than that in said reservoir-side port, the improvement wherein:

said sleeve-like valve is provided with a sleeve-like projection at its front end, which projection projects into said actuator-side port; and said pressure introducing tube has its front-end portion disposed inside a front-end surface of said spool valve.

* * * * *